April 3, 1951 G. H. LEONARD 2,547,915
GROOVING TOOL
Filed July 28, 1948 5 Sheets-Sheet 1
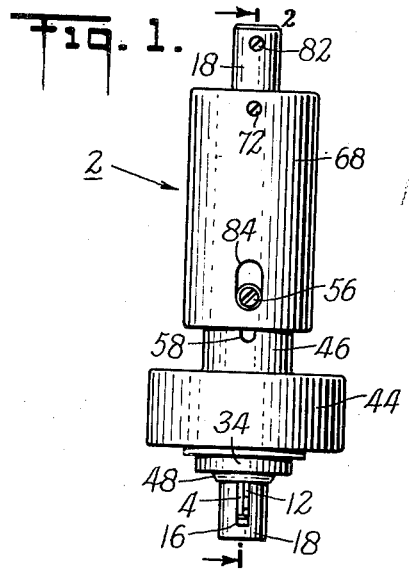
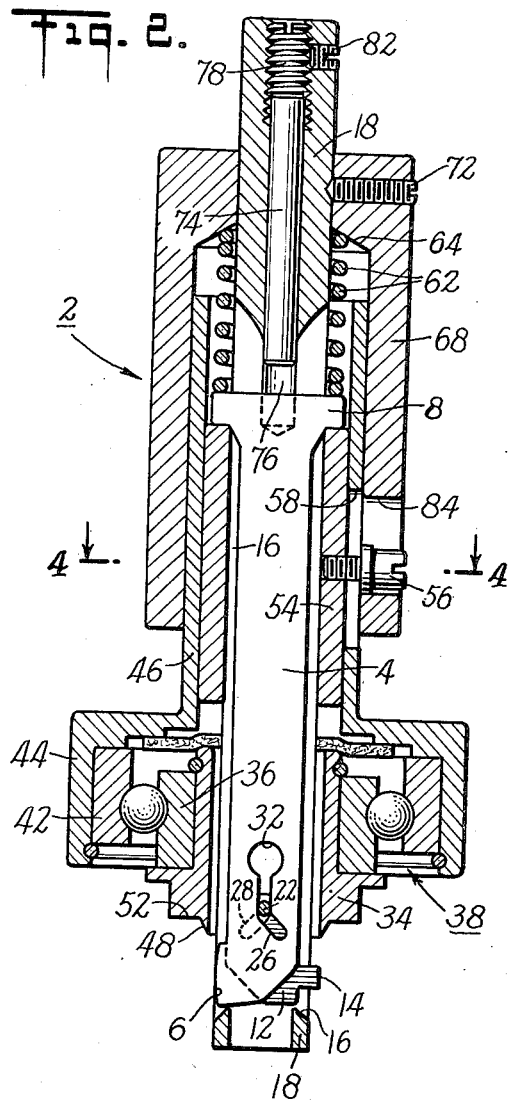
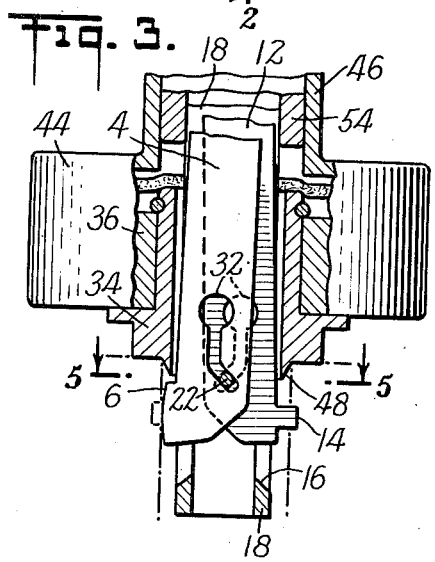
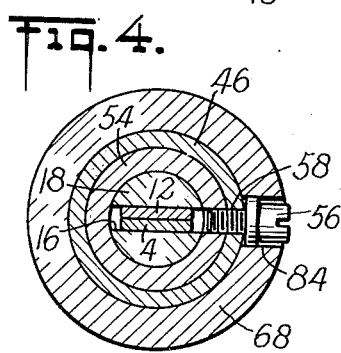
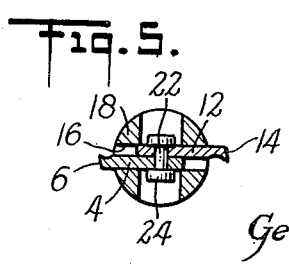
INVENTOR
George H. Leonard
BY
Blair, Curtis + Hayward
ATTORNEYS April 3, 1951 G. H. LEONARD 2,547,915
GROOVING TOOL
Filed July 28, 1948 5 Sheets-Sheet 2
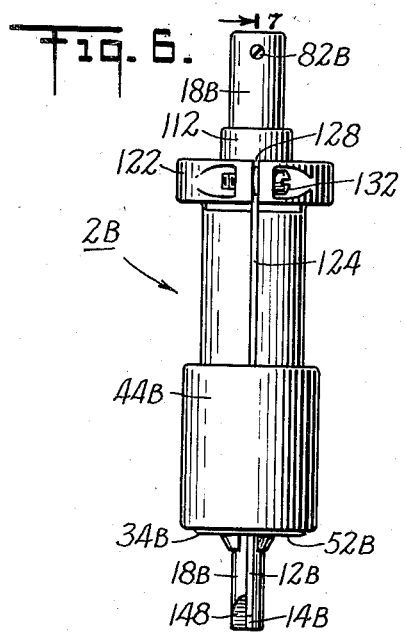
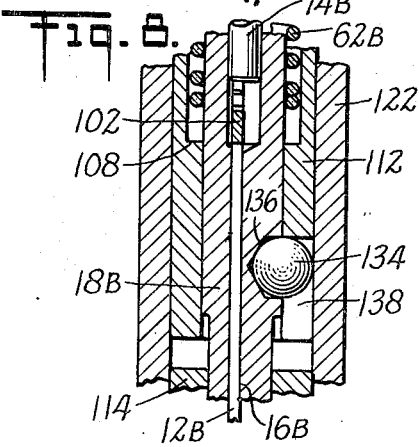
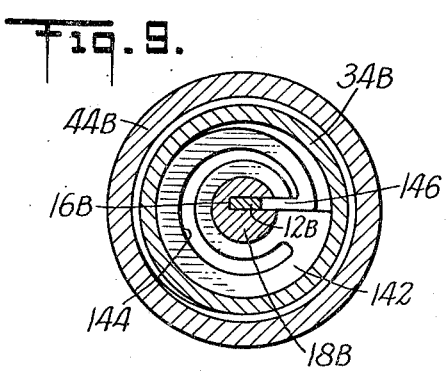
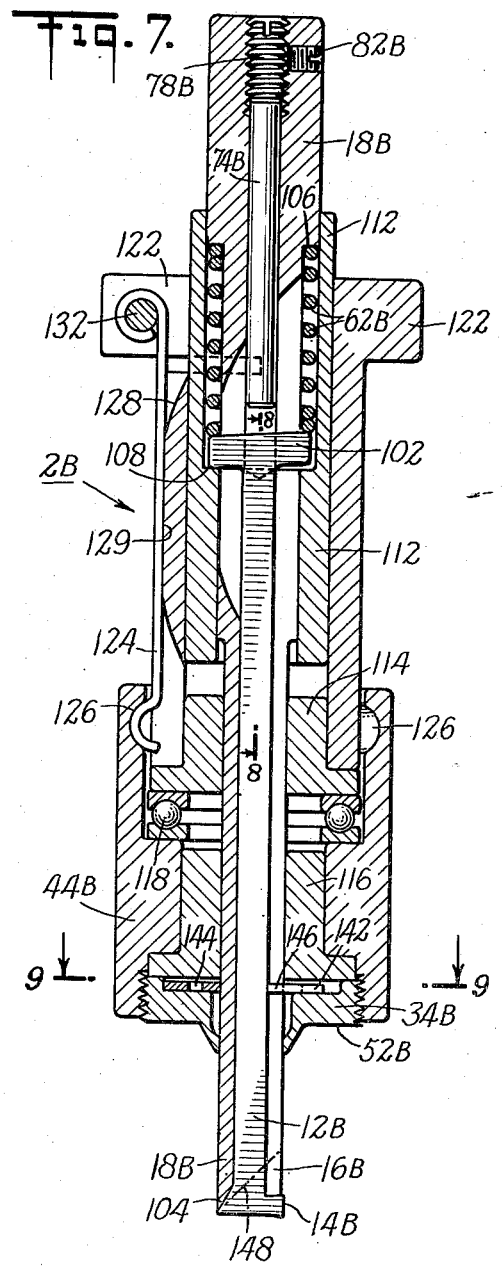
INVENTOR
George H. Leonard
BY
Blair, Curtis + Hayward
ATTORNEYS

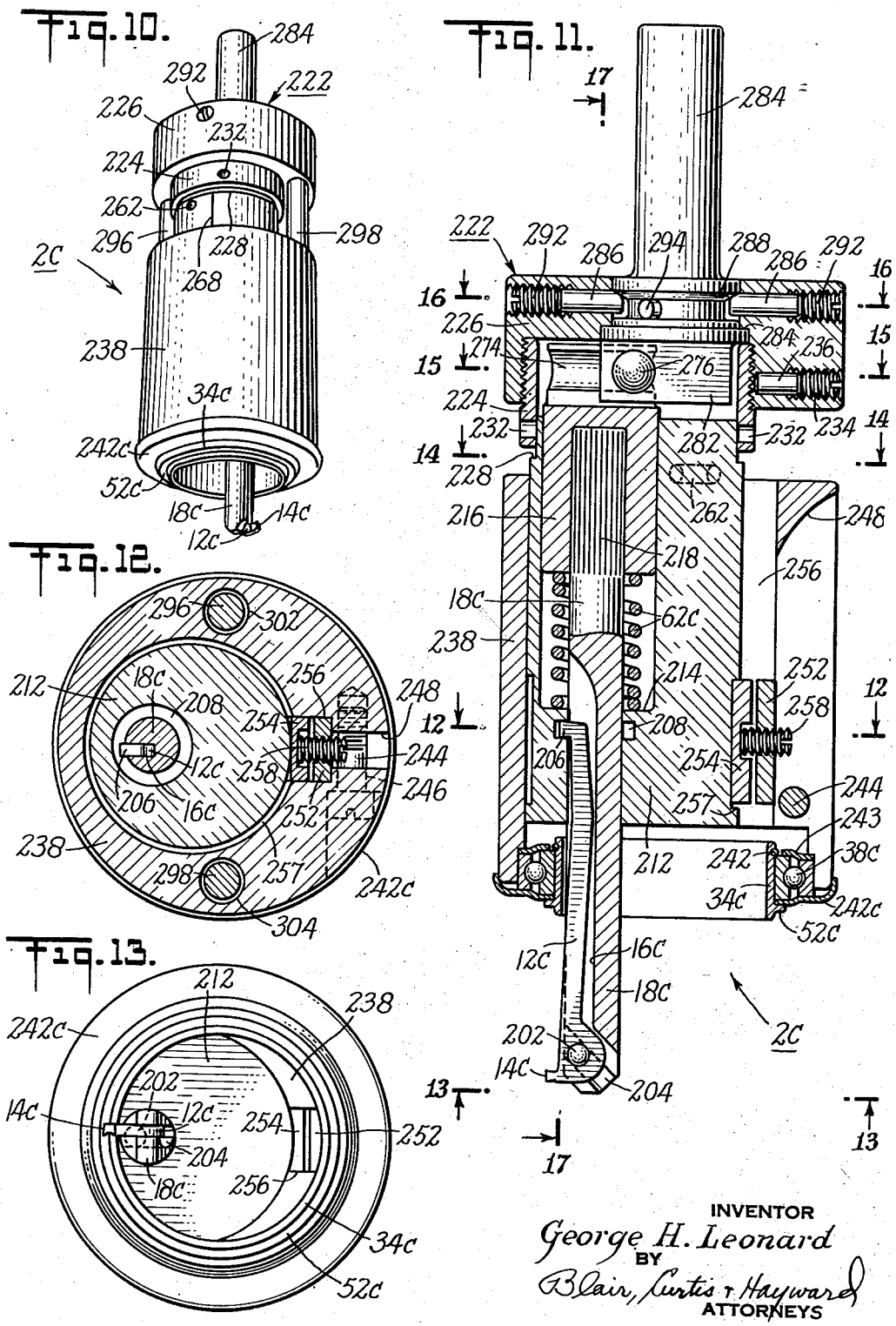

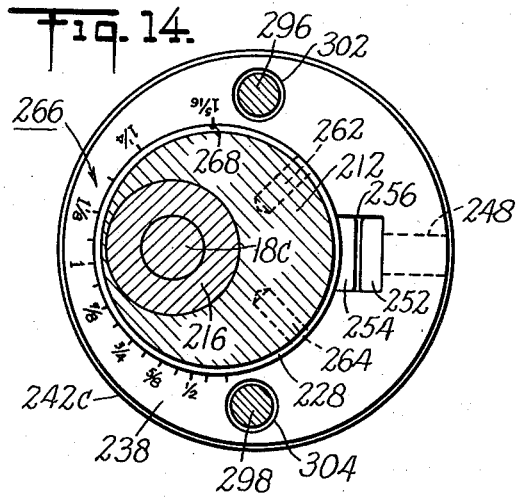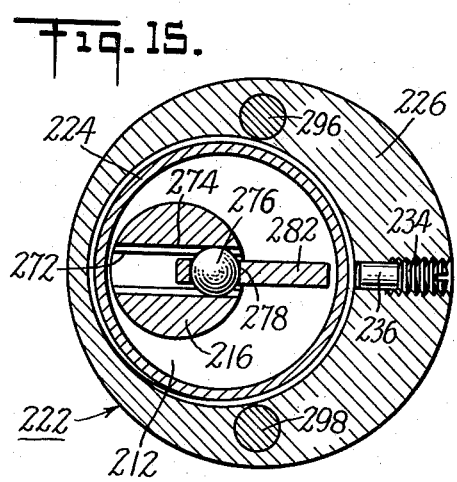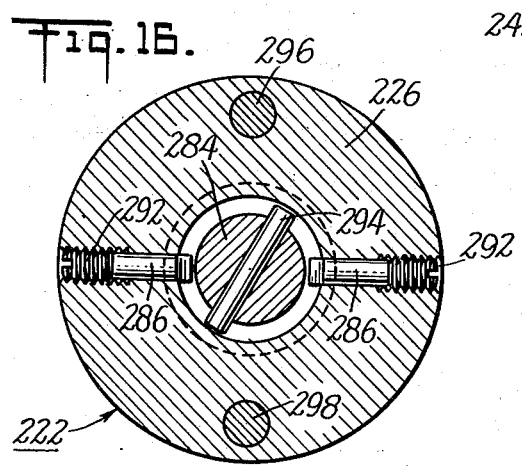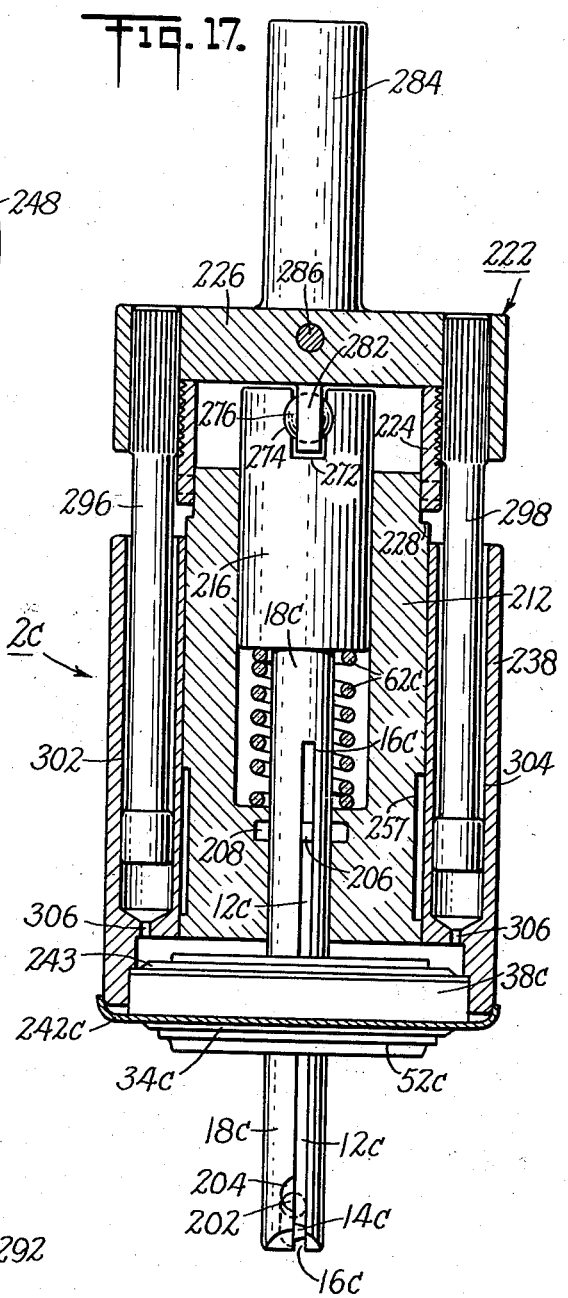

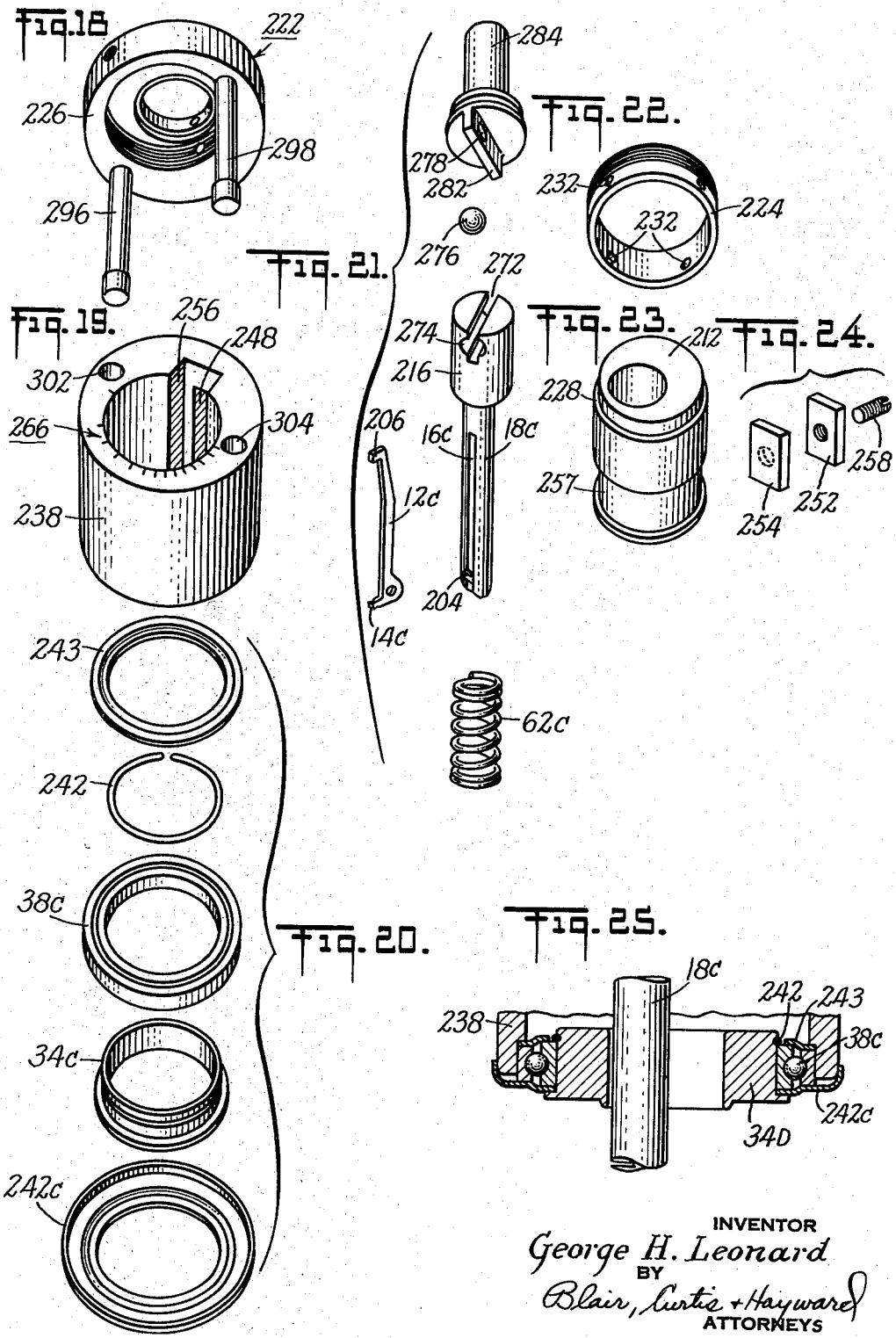

Patented Apr. 3, 1951

2,547,915

UNITED STATES PATENT OFFICE 2,547,915

GROOVING TOOL

George H. Leonard, Darien, Conn., assignor to C. G. S. Laboratories, Inc., Stamford, Conn.

Application July 28, 1948, Serial No. 41,079

2 Claims. (Cl. 77—58)

This invention relates to machine tools for performing cutting operations, and more particularly to grooving tools for cutting internal grooves in bores; such grooves being commonly used for holding lock rings or similar devices in position.

The problem of cutting internal grooves has been a source of annoyance, both to those concerned with quantity production and to the machinists doing miscellaneous job shop work. In the first instance, the process of cutting grooves in bores of small diameter is one that is relatively difficult and expensive. In the case of the small machine shop, one of the most serious problems results from the fact that the machinist is called upon to cut grooves of various widths and depths in bores of widely varying diameters. Thus, he may be called upon to purchase a particular grooving tool for a single job, with little, if any likelihood of future need for the tool. In either case, it may be necessary to frequently replace the cutting portion of the tool which often is constructed integrally with heavy or complex parts of the grooving tool, so that replacement of the cutting portion of the tool is expensive.

Accordingly, it is the object of this invention to provide a relatively inexpensive grooving tool utilizing a simple replaceable inexpensive cutter blade.

Another object is to mount the actual cutting element so that it is both rigid during cutting and readily movable radially of the tool; another object is to effect such movement during the cutting operation automatically by pressure of the work against the tool.

Another object is to provide such a cutting tool including provision for burring, that is, removing the raised edges of the groove, while the groove is being cut.

In another aspect of the invention, it is an object to provide such a grooving tool which is readily adapted for cutting grooves at various depths and in a wide range of bore diameters.

Another object is to provide such a grooving tool which is rugged in construction and well balanced so that centrifugal forces do not interfere with proper operation of the tool.

Still another object is to provide such a grooving tool which may be adjusted quickly for different diameters of bore; the cutting blade maintaining automatically the desired radial alignment.

A further object is to provide such a grooving tool in which the various moving parts are protected against damage from chips or other foreign material.

Still a further object is to provide such a grooving tool incorporating calibrated scales to indicate the proper setting for cutting grooves in bores of different diameters.

Another object is to provide such a tool in which the various adjustments, for example, radial groove depth, distance between the groove and the end of the bore, and the adjustments relating to the diameter of the bore, may be made and controlled with precision.

The invention, accordingly, consists in the features of construction, combinations of elements, and arrangements of parts; the various features of novelty which characterize the present invention being pointed out with particularity in the claims set forth herewith. For a better understanding of the invention, its advantages and the specific objects obtained with its use, reference should be had to the following description and to the accompanying drawings, in which:

Fig. 1 is an elevational view of a grooving tool embodying certain features of the present invention;

Fig. 2 is an enlarged sectional view taken on line 2—2 of Fig. 1;

Fig. 3 is a partial sectional view similar to Fig. 2 but showing the groove cutting and burring blades in extended position;

Fig. 4 is a sectional view taken on line 4—4 of Fig. 2;

Fig. 5 is a sectional view taken on line 5—5 of Fig. 3;

Fig. 6 is an elevational view of a modified form of grooving tool;

Fig. 7 is an enlarged sectional view taken on line 7—7 of Fig. 6;

Fig. 8 is a partial sectional view taken on line 8—8 of Fig. 7;

Fig. 9 is a sectional view taken on line 9—9 of Fig. 7;

Fig. 10 shows, in perspective, still another grooving tool embodying the invention;

Fig. 11 shows an enlarged axial section through the grooving tool shown in Fig. 10;

Fig. 12 is a sectional view taken along line 12—12 of Fig. 11;

Fig. 13 is a bottom view of the grooving tool shown in Fig. 10 taken along line 13—13 of Fig. 11;

Fig. 14 is a sectional view taken along line 14—14 of Fig. 11;

Fig. 15 is a sectional view taken along line 15—15 of Fig. 11;

Fig. 16 is a sectional view taken along line 16—16 of Fig. 11;

Fig. 17 is a longitudinal sectional view taken along line 17—17 of Fig. 11;

Fig. 18 is a perspective view of the shank holder and guide pillars of the tool shown in Figs. 10 to 17;

Fig. 19 is a perspective view of the cutter barrel of the same tool;

Fig. 20 is a perspective view of various component parts of the pilot and bearing assembly of the same tool;

Fig. 21 shows, in perspective, the shank holder, retainer ball, pilot body, cutting blade, and blade retracting spring of the same tool;

Fig. 22 is a perspective view of the adjusting ring of the same tool;

Fig. 23 is a perspective view of the cutter barrel of the same tool;

Fig. 24 is a perspective view of components utilized for locking in position the cutter barrel shown in Fig. 23; and Fig. 25 is a partial sectional view of the tool shown in Fig. 11 with a different pilot for internally grooving a bore of smaller diameter.

In the embodiment of the invention illustrated in Figs. 1 to 5, a grooving tool, generally indicated at 2, is adapted to cut an internal groove and to remove simultaneously any projecting edges or burrs from the area adjacent the groove. In addition, the construction is such that sidewise bending moments are avoided, so that the portion of the tool within the bore transmits only torque about the longitudinal axis of the tool.

The burring is accomplished by a burring blade 4 (Figs. 2 and 3) which comprises a length of flat tool steel with a cutting edge 6, which extends outwardly near one end of the blade, and a T-shaped portion 8 at the opposite end.

The groove is cut by groove-cutting blade 12, which has at one end a groove-cutting edge 14 and at the opposite end a T-shaped portion (not shown) similar to the T-shaped portion 8 of the burring blade 4. The cutting blade 12 is flat, similar to the burring blade 4; both pieces, for example, being stamped from flat sheets of tool stock; the desired cutting edges being subsequently hardened, and ground to the desired dimensions and shape. The burring blade 4 and the cutter blade 12 are arranged with their flat sides adjacent and extend longitudinally along a slot 16 formed in the tool body 18, which extends the full length of the grooving tool 2, with their cutting edges extending radially outwardly in opposite directions.

Such blades are inexpensive to fabricate and may be replaced easily in the tool, thus minimizing the operating cost. For example, to cut grooves of various widths, it is necessary only to replace the relatively inexpensive cutting blade 12 with a different one that has been ground to the desired dimensions.

These cutting edges are recessed normally within the slot 16 of the tool body 18, and are extended radially therefrom in order to perform the grooving and burring operations. To this end a pin 22 (see also Fig. 5), having head portions 24, is secured in the tool body 18 and extends crosswise of the slot 16, through the slot 26 in the burring blade 4 and the slot 28 in the cutting blade 12. Each of these slots is provided with an enlarged opening 32 at one end to permit removal of the blades; the opposite ends of the slots being of uniform width, but having a portion which extends at an angle with respect to the longitudinal axis of the blades. Thus, slot 26 has an end portion extending at an angle toward the right as seen in Fig. 2, whereas slot 28 has an angular portion extending toward the left as seen in that figure. It is apparent that relative longitudinal motion between the blades 4 and 12 with respect to the pin 22 will cause simultaneous extension of the burring edge 6 and the groove-cutting edge 14.

The burring and cutting edges are extended, of course, after the leading portion of the grooving tool has been inserted the proper distance within the bore; the distance between the groove-cutting edge 14 and the outer end of the bore remaining constant while the groove cutting blade is being extended and retracted. To this end, the tool body 18 and its slot 16 are arranged to move longitudinally with respect to the burring blade 4 and the groove-cutting blade 12; this movement is accomplished by the following described structure.

A pilot 34 is mounted rotatably and extends within a sealed thrust bearing, generally indicated at 38, having an inner portion 36 and an outer portion 42, which is surrounded by a tubular bearing sleeve 44, formed integrally with an upwardly extending bearing sleeve extension 46 of reduced diameter. The pilot 34 is provided with a tapered portion 48, which is adapted to enter the end of the bore in which the groove is to be cut, surrounded by a smooth shoulder 52 with which the face of the workpiece abuts.

The extension 46 of the bearing sleeve 44 is secured to a sleeve 54, which is mounted coaxially within the tubular extension 46, by a set screw 56, the body of which extends through a longitudinal slot 58 in the tubular extension 46.

The undersides of the shoulders, formed by the T-shaped ends of the burring and groove-cutting blades 4 and 12, abut the upper end of sleeve 54; the blades being pressed firmly in contact with the sleeve 54 by means of a blade-retracting spring 62, which is maintained in compression between the ends of blades 4 and 12 and the end of a bore 64 in a mounting sleeve 68, which is secured to tool body 18 by a set screw 72.

It is understood, of course, that relative rotation must be provided between the workpiece and the body 18 of the grooving tool, and that the rotary power may be applied to either.

Thus, if the tool body 18 is gripped firmly by a chuck, or other suitable source of rotative power, and the opposite end of the grooving tool is inserted within a bore which is to be internally grooved, so that the face of the workpiece rests against shoulder 52 of the pilot 34, extension of the groove-cutting edge 14 and burring edge 6 may be accomplished by exerting longitudinal force on the tool body 18, causing the tool body 18 to move further into the bore of the workpiece. The blades cannot follow this movement because they are restrained by the sleeve 54 which is secured to the pilot 34 abutting the face of the workpiece. Accordingly, the cross pin 22 moves inwardly of the bore with the tool body 18 to which it is secured and is caused to traverse the sloping portions of the slots 26 and 28 in the burring and groove cutting blades. The camming action of the pin against the sloping surfaces of the respective slots causes the groove-cutting edge 14 and the burring edge 6 to be extended simultaneously, as shown in Fig. 3.

It is apparent that this arrangement has several desirable features. For example, if the workpiece is not chucked too tightly with respect to the grooving tool 2, so that some lateral deviation is possible, the groove-cutting blade 12 and the burring blade 4 will provide a self-centering action through the medium of the pin 22. The burring blade is not intended to cut into the wall of the groove and, accordingly, is wider and usually is not so sharp as the groove cutting blade 14, so that as the groove is cut the centering action is maintained automatically and the tool body 18 transmits only torque to the cutting edges.

Moreover, this arrangement provides backing by means of the pin 22 for the cutting edges at a point longitudinally near these edges, so that chattering is minimized substantially and the depth of the groove can be controlled with greater precision.

In order to accurately control the radial depth of the groove, which is to be cut, an adjusting rod 74 is mounted slidably within a longitudinal bore 76 in the tool body 18, the upper end of the bore being closed by an adjusting screw 78 in threaded engagement therewith. As the longitudinal force is applied to the tool body 18, to extend the groove-cutting blade 14, the spring 62 is compressed by the relative movement between the mounting sleeve 68 and the groove-cutting and burring blades 12 and 4. This movement is limited by the adjusting rod 74 which extends between the inner surface of the adjusting screw 78 and the upper ends of blades 4 and 12 when the groove cutting edge is fully extended. Thus, the radial depth of the groove depends upon the position of adjusting screw 78, which may be locked in position, for example, by a set screw 82.

In order to adjust the distance within the bore at which the groove is cut, it is necessary only to adjust the distance between the shoulder 52 of the pilot 34 and the groove cutting edge 14. This is accomplished by loosening the set screw 56 (Figs. 2 and 4) which extends through a longitudinal clearance slot 84 in the mounting sleeve 68 and through the slot 58 in extension 46, moving extension 46 and, accordingly, the pilot 34, longitudinally with respect to the sleeve 54 and the tool body 18 until the desired distance between the cutting edge 14 and the shoulder 52 is obtained. The set screw 56 is then re-tightened, locking the sleeve 54 to the extension 46.

Figs. 6 to 9 show a modified grooving tool 2B particularly adapted for grooving bores of small diameter. Accordingly, the burring arrangement has been eliminated to decrease the diameter of the apparatus which must be inserted within the bore.

A groove cutting blade 12B, (Fig. 7) provided with a cutting edge 14B and a T-shaped upper portion 102, is formed from a flat sheet of tool steel material, for example, by stamping; the cutting edge 14B subsequently being hardened and ground. The cutting blade 12B is mounted within a longitudinal slot 16B extending lengthwise of a tool body 18B.

In order to extend the cutting edge 14B during the cutting operation, a cam surface 104 is formed at the lower end of the slot 16B and cooperates with a similar sloping cam surface or heel on the cutting blade 12B, directly opposite the cutting edge 14B. Thus, relative longitudinal movement of the tool body 18B with respect to the blade 12B will cause the cutting edge 14B to project from the slot 16B in accordance with the magnitude of the movement.

In order to hold the cutting blade 12B in position and to cause the cutting edge 14B to be retracted into the tool body 18B when the cutting operation has been completed, a coil spring 62B, which surrounds a portion of the tool body 18B, is held in compression between the upper surface of the T-shaped portion 102 of the cutting blade 12B and a shoulder 106 on the tool body 18B; the lower surfaces of T-shaped portion 102 resting on a shoulder 108 formed on the inner surface of a sleeve 112. Advantageously, the upper surface of the T-shaped portion 102 is formed at an angle so that the spring 62B applies greater force to the right-hand side of the cutting blade 12B, as viewed in Fig. 7, thus insuring that the cutting edge 14B will be retracted fully.

As in the previous example, the distance between the cutting edge 14B and the shoulder 52B of the pilot 34B remains fixed during the cutting operation, and the tool body 18B moves inwardly of the bore to extend the cutting edge 14B. Accordingly, this is accomplished by applying force to the tool body 18B in the direction of the bore, thus, causing the tool body to move longitudinally within the sleeve 112, compressing the spring 62B, and sliding cam surface 104 forwardly with respect to the cutting blade 12B to extend the cutting edge 14B. This movement is limited by an adjusting rod 74B, as in the embodiment previously described.

The pilot 34B is in threaded engagement with a bearing sleeve 44B, within which the tool body 18B is supported rotatably by radial bearings 114 and 116 and a conventional type thrust bearing 118.

The bearing sleeve 44B is secured to a clamping sleeve 122 by means of a wire detent spring 124, one end of which has a semi-circular shape and is adapted to fit within a circular ring groove 126 on the inner surface of the bearing sleeve 44B. The detent spring 124 rests in a longitudinal slot 128 in clamping sleeve 122; the center portion of the detent spring resting against a fulcrum or raised portion in the slot 128, as at 129, and the opposite end being retained by a screw 132 which extends across the slot 128 as shown in Fig. 6, and which screw serves also to clamp the sleeve 122 securely to the outer surface of sleeve 112. Thus, bearing sleeve 44B is rotatable with respect to the clamping sleeve 122 (the end of spring 124 traversing the groove 126), but is not free to move longitudinally with respect thereto. It is apparent that the tool may be rapidly disassembled by simply pulling off the bearing sleeve 44B.

In order that the tool body 18B can move longitudinally within sleeve 112, which is secured to clamping sleeve 122, and at the same time prevent rotary movement between the tool body 18B and the sleeve 112, a ball 134 (Fig. 8) rests in a suitable opening 136 in the tool body 18B and extends into a longitudinal slot 138 in sleeve 112; thus, locking sleeve 112 and body 18B together for rotary motion, but permitting body 18B to move longitudinally within the sleeve 112.

To prevent chips from entering the bearing structure, a sealing ring 142 (Figs. 7 and 9) is provided between the pilot 34B and the radial bearing 116. Sealing ring 142 is provided with a spiral slot 144 and a tongue portion 146, which is adapted to extend into the slot 16B to form a seal along that horizontal portion of the slot not occupied by the cutting blade 12B. Because of the slot 144, the tongue 146 is supported resiliently by the ring 142, so that it can be forced outwardly by the blade 12B as the cutting edge 14B is extended from the slot 16B.

In order to further insure that chips do not interfere with proper operation of the tool, a portion of the tool body 18B adjacent the cutting edge 14B is cut away, as at 148, in Fig. 6.

Figures 10 to 25 show still another embodiment of the invention in the form of a grooving tool 2C, which is adapted for cutting grooves in bores of various diameters. The general construction of the cutting blade control mechanism has been adapted to permit incorporating the adjustable features.

A groove-cutting blade 12C (Figs. 11 and 21) having a cutting edge 14C is mounted in a longitudinal slot 16C in a tool body 18C. A ball 202 rests within a transverse opening in the cutter blade 18C adjacent the cutting edge 14C and extends therefrom into a channel 204 extending through the tool body 18C at an angle, for example, 45 degrees, to the longitudinal axis of the tool body. In operation, the ball 202 traverses the channel 204 to extend and retract the cutting edge 14C. In Fig. 11, the grooving tool 2C is shown with the cutting edge partially extended in order to portray the construction more clearly.

To anchor the cutting blade 12C in a fixed position, a projection 206 is provided at its upper end, and extends into a circular groove 208 in a cutter barrel 212.

A spring 62C surrounds a portion of the tool body 18C within the cutter barrel 212 and is held in compression between the surface of a shoulder 214 in the cutter barrel 212 (see also Fig. 23), and the end of a tool body extension 216 which is press-fitted to a knurled end 218 of tool body 18C. The tool body extension 216 is secured, as will be described below, to a tool head portion generally indicated at 222 which is movable longitudinally with respect to the cutter barrel 212. Thus, as in the above described embodiments, the tool body 18C is movable with respect to the cutting blade 12C to extend and retract the groove-cutting edge 14C.

The radial depth of the groove to be cut is regulated by means of an adjusting ring 224 (Figs. 11 and 22) slidably surrounding the upper end of cutter barrel 212 and in threaded engagement with a shank holder 226 (Fig. 21). This adjusting ring 224 moves longitudinally with movement of the tool body 18C, so that as the cutting edge 14C is extended the end of adjusting ring 224 strikes an outwardly projecting shoulder 228 on cutter barrel 212 to limit the radial depth of the groove. Thus, the radial groove depth is controlled by screwing the adjusting ring 224 farther into or out of the shank holder 226, for example, by means of a spanner wrench adapted to fit openings 232 provided in the adjusting ring 224 for this purpose. In practice, the groove depth is adjusted by inserting the end of tool body 18C into the bore in which the groove is to be cut and compressing the tool until the cutting edge 14C just strikes the inner surface of the bore. A feeler gauge may then be used to determine the spacing between the end of adjusting ring 224 and the shoulder 228; for example, if the cam surface formed by channel 204 is at an angle of 45 degrees with respect to the direction of longitudinal movement of the tool body, this spacing will be equal to the radial depth of the groove which will have been cut when further cutting action is prevented by the abutment of ring 224 and shoulder 228. When the correct setting has been determined, a set screw 234 in threaded engagement with shank holder 226 may be tightened to lock the adjusting ring 224 in position; an insert 236, of relatively soft material, being slidably positioned within the bore beneath the set screw 234, to prevent damage to the threads of adjusting ring 224.

As in the previously-described embodiments, a pilot 34C, (see also Fig. 20) having a suitable smooth shoulder 52C against which the face of the workpiece abuts, is rotatably mounted within a pilot barrel 238 (see also Fig. 19) by means of a thrust bearing 38C. In this instance, it is desirable that the bearing 38C have the maximum possible inner diameter in order that the range of bore diameters that may be accommodated by the tool will be as large as possible. The bearing 38C is secured to the pilot 34C by a lock ring 242 and is sealed against the entrance of chips by a lower chip seal ring 242C and an upper chip seal ring 243.

In order to secure the bearing 38C to the pilot barrel 238, a screw 244 (Fig. 12) extends thru a clearance hole 246 in pilot barrel 238, across the longitudinal slot 248 in pilot barrel 238, and is in threaded engagement with the pilot barrel on the opposite side of the slot; the entire screw 244 being recessed beneath the outer surface of barrel 238. Thus, because of the resiliency imparted to barrel 238 by the longitudinal slot 248, which opens into a groove 256 of wider transverse dimension and which opens into the interior of barrel 238, the pilot barrel 238 may be clamped securely to the bearing 38C by tightening the screw 244.

In order to releasably clamp the cutter barrel 212 to the pilot barrel 238, a nut block 252 and a clamping pad 254 (see also Fig. 24) are positioned within the longitudinal groove 256 on the inner surface of pilot barrel 238 (Figs. 11 and 12). The clamping pad 254 extends into a peripheral notch 257 (Figs. 11 and 23) in the outer surface of cutter barrel 212 against which it is pressed by a set screw 258, which is in threaded engagement with the nut block 252 and which extends outwardly into slot 248. As set screw 258 is tightened, clamping pad 254 is forced inwardly against the surface of cutter barrel 212, and nut block 252 is forced outwardly against the inner surface of the pilot barrel 238, thus, locking the cutter and pilot barrels securely together. It is apparent that, by loosening set screw 258, the cutter barrel 212 and the parts secured thereto can be moved longitudinally with respect to the pilot 34C and the pilot barrel 238; the clamping assembly operated by set screw 258 moving longitudinally, with the cutter barrel 212, along the slots 256 and 248. Thus, the distance within the bore at which the groove is to be cut can be adjusted readily by gauging the distance between pilot shoulder 52C and cutting edge 14C and tightening screw 258 to maintain this adjustment.

In order that the grooving tool may be adjusted for cutting grooves in bores of various diameters, the tool body 18C is mounted in eccentric relationship within the cutter barrel 212, and the cutter barrel 212 is mounted in an eccentric or off-center relationship with respect to the pilot 34C and pilot barrel 238. With this arrangement, by rotating the cutter barrel 212, with respect to the pilot barrel 238 (see Fig. 12), the cutting edge 14C may be placed at any desired radial distance from the longitudinal center-line of the cutter barrel 238, and thus from the longitudinal axis of the bore in which a groove is to be cut. This is accomplished by rotating the cutter barrel 212, for example, by means of a suitable tool inserted in opening 262 or 264 (Figs. 11 and 14), until the radial position of cutting edge 14C corresponds to the diameter of the bore which is to be grooved. This adjustment need not be made with precision because the groove depth adjustment; (described above) which should be made subsequently to this bore diameter adjustment, will correct automatically for slight error in the bore diameter adjustment. In order to assist in this radial adjustment, a scale generally indicated at 266 (Fig. 14) is inscribed on the upper surface of pilot barrel 238 and is calibrated in conjunction with a longitudinal scale mark 268 (see also Fig. 10) inscribed on the outer surface of cutter barrel 212. Thus, the radial adjustment may be made quickly and accurately merely by rotating the cutter barrel until the scale mark 268 indicates the desired bore diameter.

It is apparent also that the tool body 18C must be rotated about its own longitudinal axis with respect to the cutter barrel 212, when the radial adjustment is made, in order that the cutting blade 12C will be directed radially with respect to the bore that is to be grooved. This adjustment is maintained automatically, in this embodiment, by means of the following described structure.

The upper end of the tool body extension 216 is provided with a transverse groove 272 (Figs. 11, 15, 17 and 21) having an enlarged portion 274 forming a raceway for a steel ball 276 which is carried by a transverse hole 278 in a key extension 282 on the lower surface of a shank 284.

This shank 284 is secured within the shank holder 226 by means of a shoulder 284 (Fig. 11) and friction blocks 286, for example, formed of brass or similar material, which are forced against a beveled face 288, on shank 284, by set screws 292 which are in threaded engagement with the shank holder 226.

Thus, when set screws 292 are loosened slightly and the cutter barrel 212 rotated, the shank 284, which is keyed slidably to the eccentrically positioned tool body 18C, will cause the pilot body 18C to rotate in such manner that the cutting blade 12C will be directed always radially with respect to the bore in which the groove is to be cut. This follows from the fact that the bore, the pilot 34C, and the shank 284, have a common axis; the key extension 282 always being aligned radially with respect to this axis and, therefore, the cutter blade 12C, which is held by the pilot 18C, can rotate only as permitted or caused by the shank 284 and key 282. In order to limit the amount by which the cutter barrel 212 may be rotated during the radial adjustment, a cross pin 294 (Fig. 16) is provided which extends on each side of the shank 284 and impinges against the friction blocks 286. When this radial adjustment has been completed, the set screws 292 are tightened to restore the rigidity of the structure.

In order to maintain proper alignment of the various components of the tool 2, guide pillars 296 and 298 (Figs. 17 and 18) are provided, which are press-fitted into shank holder 226 and extend downwardly into openings 302 and 304, respectively, in pilot barrel 238; an opening 306 being provided at the bottom of each of the holes 302 and 304 to permit the passage of air during assembly or adjustment of the tool.

It is understood, of course, that when the tool is to be used with a different diameter of bore that the pilot 34C must be changed in accordance with the size of the bore. For example, Fig. 25 shows a pilot 34D inserted in the tool for grooving a bore of smaller diameter than that shown in the other figures.

I claim:

1. In a grooving tool for cutting internal grooves in bores, the combination comprising a tool body having a longitudinal slot therein, a housing surrounding a portion of said body and keyed thereto for rotary movement therewith and for longitudinal movement with respect thereto, a flat cutting blade positioned along said slot and having a laterally-extending groove-cutting edge at one end and a T-shaped head at the opposite end the upper surface of which forms an angle of less than ninety degrees with respect to the longitudinal axis of said body, said blade being pivotally anchored to said housing, a cam surface associated with said blade and tool body for applying a rotary force to said blade upon relative longitudinal movement therebetween to cause said cutting edge to extend from said slot, and a blade retracting compression spring surrounding said body and bearing upon said housing and said upper surface of said T-shaped head thereby to tend to separate axially said body and said housing and to rotate said blade so as to retract said cutting edge.

2. A grooving tool for cutting internal grooves within a bore, comprising a tool body having a longitudinal slot therein, a housing surrounding said tool body and adapted for longitudinal movement with respect thereto, a flat groove-cutting blade positioned in said slot and having a lateral projection at one end and a laterally projecting groove-cutting edge at the opposite end, said blade being secured for pivotal movement about said projection with respect to said housing and for longitudinal movement with respect to said tool body, said projection being comprised in a T-shaped portion of said blade, said T-shaped portion forming an end surface of said blade extending at an angle of less than ninety degrees to the longitudinal axis of said blade, a cam surface positioned near said cutting edge and extending at an angle to the longitudinal axis of said tool body for translating relative longitudinal movement between said blade and said body into pivotal movement of said blade about said projection to cause said cutting edge to move transversely of said slot, a spring bearing against said end surface of said blade and tending to force said cutting edge inwardly of said slot in said tool body, and a pilot surrounding said tool body and rotatably supported with respect to said housing.

GEORGE H. LEONARD.

REFERENCES CITED

The following references are of record in the file of this patent:

UNITED STATES PATENTS

| Number | Name | Date |
|---|---|---|
| 614,672 | Sweigart | Nov. 22, 1898 |
| 869,628 | Fleming | Oct. 28, 1907 |
| 1,312,737 | Krueger | Aug. 12, 1919 |
| 1,331,322 | Connell | Feb. 17, 1920 |
| 1,922,630 | Oberhuber | Aug. 15, 1933 |
| 2,224,480 | Kartarik | Dec. 10, 1940 |
| 2,325,020 | Shaw | July 20, 1943 |
| 2,359,859 | Jarvis | Oct. 10, 1944 |
| 2,365,549 | Haynes | Dec. 19, 1944 |
| 2,433,976 | Babka | Jan. 6, 1948 |

FOREIGN PATENTS

| Number | Country | Date |
|---|---|---|
| 569,241 | Great Britain | May 14, 1945 |